Nov. 21, 1950  L. M. CHATTLER  2,530,377
AUTOMATIC OPEN CENTER SIX PORT CONTROL VALVE
Filed Aug. 22, 1949
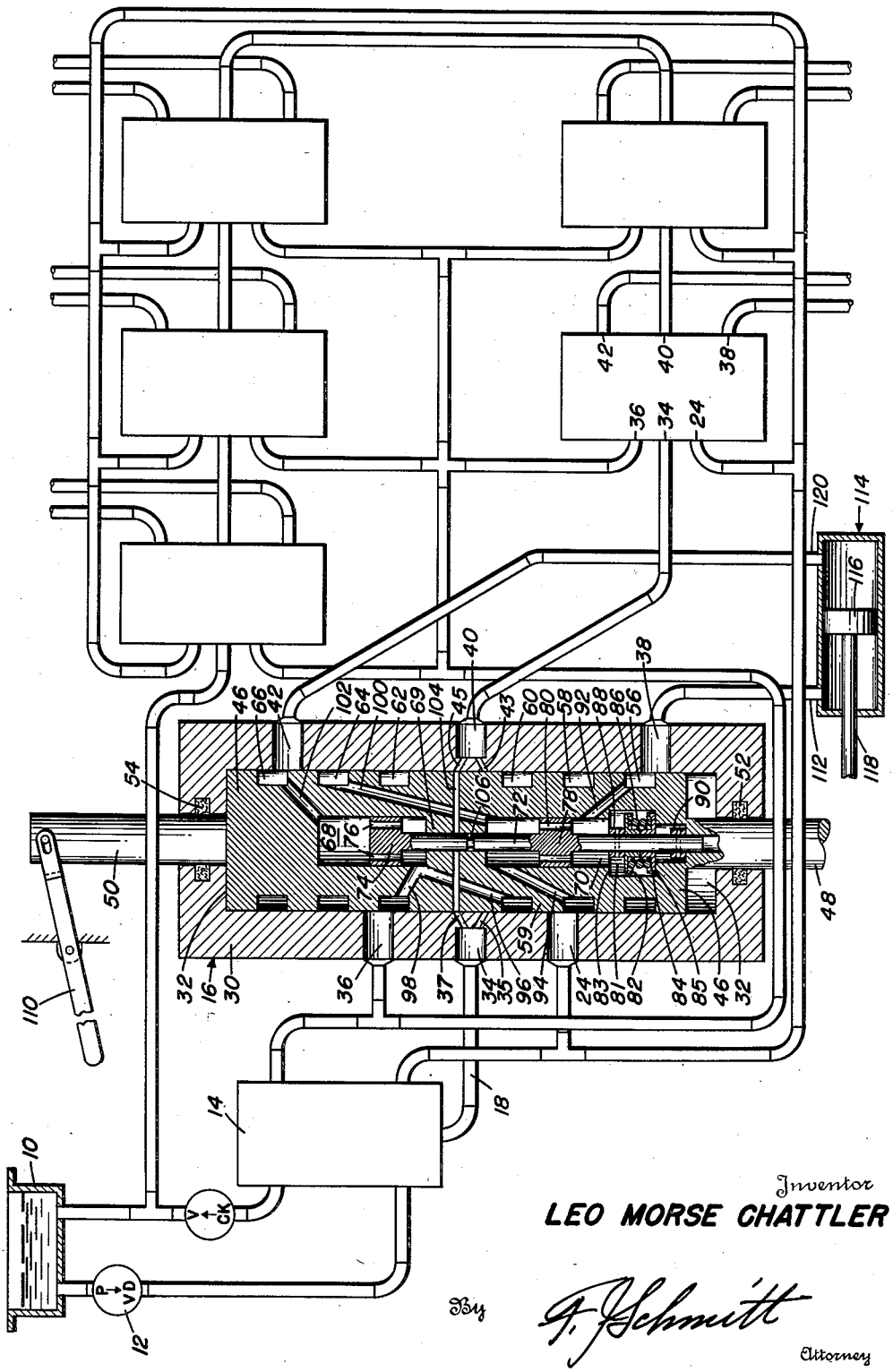
Inventor
LEO MORSE CHATTLER
By F. J. Schmitt
Attorney Patented Nov. 21, 1950

2,530,377

UNITED STATES PATENT OFFICE 2,530,377

AUTOMATIC OPEN CENTER SIX PORT CONTROL VALVE

Leo M. Chattler, Washington, D. C.

Application August 22, 1949, Serial No. 111,754

1 Claim. (Cl. 277—7)

(Granted under the act of March 3, 1883, as amended April 30, 1928; 370 O. G. 757)

This invention relates to a hydraulic system or systems and in particular to valves used for the control of the various functions of the system and which valves are of the combination series-parallel automatic six port type.

The general object of the invention is to provide a control valve which during operation acts as a parallel circuit control valve, with its attendant advantages such as operating all systems simultaneously, etc., and after completion of an operation will automatically return to a neutral position and act as a series circuit unit with its attendant advantages such as depressurizing the system, etc., also to provide a unit which will not require the control handle to go to a neutral position in order to obtain a series circuit and thus depressurize the system.

It is an additional object of the invention to provide a hydraulic system which, by reason of the low pressure existing therein caused by this particular type of control valve, gives:

1. Reduction in fire hazard because of relatively low pressure.

2. Increased reliability of the system because the system pressure is not constantly trying to penetrate the joints, fittings and valve attachments.

3. Decreased maintenance problems because the constant vibration encountered in reciprocating engine or jet engine propeller aircraft are not assisting the internal pressure to escape.

4. Increased overall life of the hydraulic system, units and installation because there are no units constantly operating or being subjected to the maximum system pressure or excessive surge pressures.

5. The life of the packing used is longer because the seals are not constantly being subjected to high internal pressure and thus age hardened and set permanently as a result of continual distortion.

6. Lower cost of equipment because internal leakage can be allowed thus permitting greater manufacturing tolerances.

The control valve of this invention has a general application in hydraulic systems where an operative function is performed periodically. It is particularly effective in hydraulic systems of aircraft where such functions as raising and lowering of the landing gear, operation of the arresting gear, the speed brakes, the landing flaps, wing folding, and escape hatches, etc., are operated hydraulically.

Present system installations for the control of these functions generally include control valves of the four port type which are connected in the system in parallel. These systems are under constant high pressure which exerts a deleterious effect on the movable parts, on the packing and in the system in general.

The attainment of the above recited objectives is accomplished by the automatic, open center six port control valve of this invention. A preferred embodiment thereof is illustrated in the accompanying drawing wherein, the figure of the drawing is a diagrammatic layout of a hydraulic system which includes the control valves of the subject invention, and shows a detail of the control valve in longitudinal section.

Referring further to the figure of the drawing the hydraulic system shown comprises a conventional hydraulic fluid reservoir 10 connected to the suction side of a variable volume pump 12. The discharge from this pump is directed through a pressure operated shut off valve 14 which is normally open and which also acts as a system relief valve when in the closed position. The chief function of valve 14 is to divide and direct the delivery of the hydraulic fluid into about 5–10% to the series open center ports of the control valve shown generally at 16 via conduit 18 and 90 to 95% of the fluid directly back to the reservoir through the shut off valve 14. The six port valves are normally in an open center position. That is to say that when none of them are in operating position about 5–10% of the hydraulic fluid is delivered by conduit 18 through the center ports 34 of these valves in series and is returned to hydraulic fluid reservoir 10, thus acting as a circulatory column for keeping valve 14 open, so that 90–95% of the pump output can be by-passed to the reservoir, thereby reducing the pressure on the system to a relatively low magnitude. These control valves are arranged in parallel in the performance of their particular function. Thus any one or more of the valves may be operated independently of the other valves. In this respect the hydraulic system is similar to the conventional or prior art systems. The arrangement of the valves for center flow of the fluid therethrough in series in addition to the parallel system is the chief characteristic of distinguishment over the prior art systems.

Again referring to the drawing, a preferred embodiment of the control valve is shown in longitudinal section generally at 16. This valve may comprise a cylindrical housing 30 which is provided with a central interior chamber 32. This housing is provided with a pressure fluid inlet port 24, open center inlet port 34, return port 36, pressure fluid inlet and discharge port 38, open center discharge port 40, and inlet and discharge port 42. Open center ports 34 and 40 have channels 35, 37, 43, and 45 connecting them with interior chamber 32, respectively. Valve cylinder 46, closely fitting diametrically, is mounted within interior chamber 32 for reciprocation therein. Spools 48 and 50 extend from either end of valve cylinder 46 through the end walls of housing 30 being sealed with respect thereto by packing glands 52 and 54 respectively. It is apparent that application of force to either of spools 48 or 50 may move valve cylinder 46 from one position at the top as shown in the drawing to a second position at the bottom. These are the two operating positions of the valve, the second being the reverse of the first position. There is a point about half way between these two positions at which both the pressure flow and the return of the fluid is cut off. Operation of the valve to this position locks the operated motor in its position which in the case of operating the landing gear of the aircraft will hold said landing gear either up or down as the case may be. This operative effect is brought about by the structure of valve cylinder 46 and its relationship to the various ports above defined. The structure of valve cylinder 46 comprises a plurality of annular grooves 56, 58, 60, 62, 64 and 66. The grooves are spaced in the periphery of valve cylinder 46 so that groove 56 is partially or completely open to discharge port 38 in all positions of the valve cylinder. Grooves 58 and 60 are positioned so that groove 58 partly uncovers inlet port 24 at the extreme top and groove 60 partly uncovers this port at the extreme bottom position of valve cylinder 46. About half way between these two extreme positions inlet port 24 is covered and blocked by solid portion 59 of the valve cylinder. Valve cylinder 46 is provided with two axially disposed chambers 68 and 70 which are separated by partition wall 69. Spool 72 extends through this partition wall and is journalled for sliding movement therein. Piston 74 is mounted on the end of spool 72 in chamber 68 and is in relatively close sliding contact with the sidewalls thereof. Piston 74 is provided with a plurality of channels 76 of small diameter extending therethrough from one terminal face to the other. Piston 78 is also mounted on spool 72 within chamber 70 and is in relatively close sliding contact with the sidewalls of this chamber. Within an enlarged portion 81 of chamber 70 spring retainer plates 82 and 84 are slidably mounted on spool 72. Between these plates spring 86 is held. Collars 88 and 90 are keyed to spool 72 in positions to transmit the recoil of spring 86 to spool 72 when the hydraulic pressures on both sides of pistons 74 and 78 are equalized. The diametral enlargement of chamber 70 as at 81 provides abutting shoulders 83 and 85 which limit the movement of the retaining plates 82 and 84 and provide a base of reaction for the recoil movement of spring 86. The function of this recoil movement will be explained hereinafter.

Valve cylinder 46 is provided with channels connecting annular grooves 56, 58, 60, 62, 64 and 66 with chambers 68 and 70 as follows. Groove 56 is connected to chamber 70 at a point below piston 78 by channel 92. This channel is always open to chamber 70. Groove 58 is connected to chamber 70 above 78 by channel 94. This channel also is always open to chamber 70. Groove 60 is connected to chamber 68 by channel 96 below piston 74. Groove 62 is likewise connected to chamber 68 by channel 98. Groove 64 is connected to chamber 70 by channel 100 and groove 66 is connected to chamber 68 by channel 102.

Center channel 104 extends across valve cylinder 46 at the midpoint thereof through partition walls 69. This channel registers with channels 35 and 43 when valve cylinder 46 is at the extreme lower position and with channels 37 and 45 when the said cylinder is at the extreme upper position, as shown in the drawing. Channel 104 forms an open center conduit for the hydraulic fluid when annular groove 106 is in registration therewith.

The operation of the control valve is as follows. Assume that this valve is for the operative control of the raising and lowering of the landing gear of an airplane and that moving the valve cylinder to the extreme top position as shown in the drawing operates to lower the landing gear. The plane pilot moves the valve cylinder to this position by moving the control lever (shown diagrammatically at 110 with connecting linkage) to the "lower" position. In moving valve cylinder 46 from the "raise" to the "lower" position, registration of channel 104 with channel 35 is broken and groove 58 is moved into registration with inlet port 24. Center flow of the hydraulic fluid through valve cylinder 46 is thereby stopped and hydraulic fluid under relatively high pressure flows through inlet port 24, into annular groove 58, through channel 94, into chamber 70, through channels 80 in piston 78, into channel 92, groove 56, out through port 38, through conduit 112 and into servo-motor 114 wherein piston 116 and piston rod 118 are moved to the right. The movement of piston rod to the right operates mechanism (not shown) to lower the landing gear. The movement of piston 116 to the right forces hydraulic fluid in back thereof out through conduit 120, through port 42, groove 66, channel 102, chamber 68, channels 76 in piston 74, channel 98, groove 62 and into the return line to reservoir 10 through port 36. The differential pressure set up between the top and bottom faces of pistons 74 and 78 by the flow of the hydraulic fluid therethrough moves spool 72 downwardly thereby breaking registration of annular groove 106 in spool 72 with channel 104 and preventing immediate resumption of center flow with its attendant drop in hydraulic pressure upon the arrival of valve cylinder 46 at the extreme top position. Hydraulic fluid continues to flow as above described to servo-motor 114 until piston 116 reaches the end of its stroke. Upon cessation of the flow of hydraulic fluid to servo-motor 114, the pressure differential existing between the faces of piston 74 and 78 reduces to zero. Spring 68 then moves spool 72 upwardly so that annular groove 106 registers with channel 104 and center flow of the system is resumed.

For the reverse operation, viz, the raising of the landing gear in this case, the plane pilot moves valve cylinder 46 downwardly by throwing lever 110 to the "raise" position. Registration of channel 104 with channel 37 is broken thereby interrupting center flow of the hydraulic fluid through valve cylinder 46. Annular groove 60 partly uncovers inlet port 24 admitting hydraulic fluid therefrom under high pressure. The fluid flows through channel 96 into chamber 68, through channels 76 in piston 74, through channel 102, into annular groove 66, out through port 42 and to the right side of piston 116 in servo-motor 114. As piston 116 moves to the left, the fluid in servo-motor 114 to the left of piston 116 is forced out through conduit 112 through port 38, annular groove 56, channel 92 into chamber 70, through channels 80 in piston 78, through channel 100, around annular groove 64 and out through port 36 and into the return line to reservoir 10. The differential pressure set up across pistons 74 and 78 moves spool 72 upwardly thereby breaking registration of annular groove 106 with center flow channel 104. Passage of the hydraulic fluid through channel 104 is thus prevented even after registration of channel 104 with channels 35 and 43. Thus hydraulic fluid continues to flow at high pressure through conduit 120 to the right side of piston 116 in servo-motor 114. Upon completion of the stroke to the left of piston 116 and piston rod 118 hydraulic fluid ceases to flow to and from servo-motor 114, the pressure differential existing across pistons 74 and 78 becomes zero and spring 86, which has been compressed between retaining plates 82 and 84 against abutment 83, moves spool 72 by exerting a thrust on retaining collar 90, downwardly, thereby bringing annular groove 106 into registration with center flow channel 104 and channels 35 and 43. Center flow of the system is restored and the hydraulic pressure drops to a relatively low magnitude.

The applicant's invention is therefore seen to reside in the provision of a center flow control valve as a component of a hydraulic system in which (valve) the structural components bear a definite operative relationship to each other whereby the hydraulic fluid circulates at relatively low pressure through the system when none of the operative functions are in effect and whereby when one or more of the functions are in operation, hydraulic fluid is fed thereto under high pressure.

While a particular embodiment of a control valve has been herein illustrated and described it is not desired to be strictly limited thereto beyond the scope of the herewith appended claims as obviously changes in the structure of the valve could be made by one skilled in the art without departing from the spirit and scope of the invention.

The invention described herein may be manufactured and used by or for the Government of the United States of America for governmental purposes without the payment of any royalties thereon or therefor.

What is claimed is:

An automatic, six port valve for regulating the flow of fluid in a hydraulic system and for controlling the operation of various devices by said fluid comprising a valve body, a chamber within said body disposed about the longitudinal axis thereof, a valve member slidably journalled in the end walls of said body, in movable contact with the sidewalls of said chamber and adapted to take one of two operating positions within said chamber, two additional chambers within said valve member separated by a partition wall and disposed about the longitudinal axis of said valve member, a spool slidably journalled in said partition wall extending into both of said additional chambers, a piston mounted on said spool in each of said additional chambers dividing each chamber into two compartments, a plurality of channels in each piston communicating with the said compartments of the chamber in which they are positioned, resilient means slidably mounted near one end of said spool, spaced collars keyed to said spool for transmitting the thrust of said resilient means to said spool, an inlet port in the sidewall of said valve body, six annular grooves in spaced relationship in the periphery of said valve member, the second groove adapted to register with said inlet port in one extreme position of said valve member and the third groove adapted to register therewith in the other extreme position thereof, a channel in said valve member connecting said second annular groove with one compartment in the first of said additional chambers, a channel in said valve member connecting the other compartment in the first additional chamber with the first annular groove in said valve member, an outlet-inlet port in the sidewall of said valve body in registration with said first annular groove whereby a continuous path of flow of fluid from said inlet port to said outlet-inlet port is provided, a discharge port in the sidewall of said valve body in registration with the fourth or fifth of said annular grooves in the periphery of said valve member when the latter is in either one of its said two operating positions, a channel in said valve member connecting said fourth annular groove with one compartment in the second additional chamber, a channel in said valve member connecting the other compartment in said second additional chamber with the sixth annular groove in the periphery of said valve member, an inlet-outlet port in the sidewall of said valve body in communication with said sixth annular groove, whereby a continuous path of flow of fluid from said inlet-outlet port to said discharge port is provided, an open center inlet port in the sidewall of said valve body, two spaced channels in the sidewall of said valve body connecting said center inlet port with the chamber in said valve body, a transverse channel in said valve member, positioned midway between the ends thereof, in registration with one or the other of said spaced channels when said valve member is in either one of its operative positions, an outlet open center port in the sidewall of said valve body, two spaced channels connecting said outlet center port with the chamber in said valve body, one or the other of said spaced channels in registration with said transverse channel when said valve member is in either one of its operative positions, an annular groove on said spool positioned midway between said pistons thereon in registration with said transverse channel when fluid pressure on both sides of said pistons is equalized, whereby a continuous path of fluid flow transversely through the center of said six port valve is provided, a channel in said valve member connecting the third annular groove in the periphery of said valve member with one compartment in the second of said additional chambers and a channel in said valve member connecting one compartment in the first of said additional chambers with the fifth annular groove in the periphery of said valve member, whereby upon movement of said valve member to either one of its operative positions fluid may be directed from said inlet port to either one of said inlet-outlet ports, the return fluid may be directed from either one of said inlet-outlet ports to said discharge port, fluid flow from said center inlet port to said center outlet port stopped by the off-setting of said annular groove on said spool from registration with said transverse channel in said valve member and upon equalization of pressures on both sides of said pistons restored by the automatic movement of said annular groove into registration with said transverse channel by said resilient means.

LEO M. CHATTLER.

No references cited.